(12) United States Patent
Cron et al.

(10) Patent No.: US 8,960,248 B2
(45) Date of Patent: Feb. 24, 2015

(54) METHOD AND APPARATUS FOR MULTILAYER SHEAR BAND REINFORCEMENT

(75) Inventors: Steve M. Cron, Simpsonville, SC (US); Timothy B. Rhyne, Greenville, SC (US)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 153 days.

(21) Appl. No.: 13/497,618

(22) PCT Filed: Oct. 15, 2009

(86) PCT No.: PCT/US2009/060746
§ 371 (c)(1),
(2), (4) Date: Mar. 22, 2012

(87) PCT Pub. No.: WO2011/046553
PCT Pub. Date: Apr. 21, 2011

(65) Prior Publication Data
US 2012/0216932 A1    Aug. 30, 2012

(51) Int. Cl.
| | | |
|---|---|---|
| B60C 7/00 | (2006.01) |
| B60C 7/18 | (2006.01) |
| B60C 7/22 | (2006.01) |
| B60C 9/18 | (2006.01) |
| B60C 99/00 | (2006.01) |

(52) U.S. Cl.
CPC ... B60C 7/18 (2013.01); B60C 7/22 (2013.01); B60C 9/18 (2013.01); B60C 99/006 (2013.04)
USPC ........................................... 152/246

(58) Field of Classification Search
USPC ............... 152/1, 5, 7, 11, 12, 41, 69, 80, 197, 152/246, 253, 270, 273, 302, 310, 323, 324, 152/326, 327
See application file for complete search history.

(56) References Cited

U.S. PATENT DOCUMENTS

| | | |
|---|---|---|
| 1,440,974 A | 2/1923 | Dornburgh |
| 1,495,083 A | 5/1924 | Krusemark |
| 2,388,421 A | 11/1945 | Kraft et al. |

(Continued)

FOREIGN PATENT DOCUMENTS

| | | |
|---|---|---|
| BR | 199902986 A | 3/2000 |
| EP | 0073313 A2 | 3/1983 |

(Continued)

OTHER PUBLICATIONS

PCT International Search Report for PCT/US2011/030467, dated Jun. 13, 2011.

(Continued)

Primary Examiner — S. Joseph Morano
Assistant Examiner — Jean Charleston
(74) Attorney, Agent, or Firm — Dority & Manning, P.A.

(57) ABSTRACT

A method is provided for reinforcement of a multiple layer shear band as may be used in a non-pneumatic tire More particularly, an iterative method of improving the performance characteristics (such as e g, increasing the bending stiffness) of a shear band without increasing its thickness or of reducing the thickness of a shear band while maintaining its performance characteristics is presented Shear bands constructed according to this method are also provided.

24 Claims, 2 Drawing Sheets

(56) References Cited

U.S. PATENT DOCUMENTS

| | | | |
|---|---|---|---|
| 3,779,835 A | 1/1973 | Lohr et al. | |
| 3,973,613 A | 8/1976 | Marzocchi | |
| 4,024,895 A | 5/1977 | Barron | |
| 4,073,330 A | 2/1978 | Allard | |
| 4,734,144 A | 3/1988 | Markow | |
| 4,794,966 A | 1/1989 | Markow | |
| 4,966,212 A | 10/1990 | Hill | |
| 5,042,544 A | 8/1991 | Dehasse | |
| 5,221,382 A | 6/1993 | Sid-Ahmed | |
| 5,265,659 A | 11/1993 | Pajtas et al. | |
| 5,313,994 A * | 5/1994 | Hill et al. | 152/323 |
| 5,565,257 A | 10/1996 | Tingley | |
| 5,837,077 A | 11/1998 | Kabe et al. | |
| 5,906,836 A | 5/1999 | Panaroni et al. | |
| 6,109,319 A | 8/2000 | Gardetto | |
| 6,422,279 B1 | 7/2002 | Williams et al. | |
| 6,460,586 B1 | 10/2002 | Spragg et al. | |
| 6,470,937 B1 | 10/2002 | Spragg et al. | |
| 6,701,987 B1 | 3/2004 | Abbott | |
| 6,769,465 B2 | 8/2004 | Rhyne et al. | |
| 6,792,986 B2 | 9/2004 | Allen et al. | |
| 6,994,134 B2 | 2/2006 | Grah | |
| 7,013,939 B2 | 3/2006 | Rhyne et al. | |
| 7,125,083 B2 | 10/2006 | Piumarta et al. | |
| 7,363,805 B2 | 4/2008 | Jayakumar et al. | |
| 7,418,988 B2 * | 9/2008 | Cron et al. | 152/5 |
| 7,650,919 B2 | 1/2010 | Rhyne et al. | |
| 2004/0012246 A1 | 1/2004 | Rhyne | |
| 2007/0267116 A1 | 11/2007 | Rhyne et al. | |
| 2008/0250843 A1 | 10/2008 | Albohr et al. | |
| 2008/0314486 A1 * | 12/2008 | Manesh et al. | 152/328 |
| 2009/0071584 A1 | 3/2009 | Zhang et al. | |
| 2010/0018621 A1 * | 1/2010 | Thompsom | 152/302 |
| 2010/0243122 A1 | 9/2010 | Domingo et al. | |
| 2011/0223366 A1 | 9/2011 | Petri et al. | |

FOREIGN PATENT DOCUMENTS

| | | |
|---|---|---|
| EP | 0400859 A2 | 12/1990 |
| EP | 853009 A2 | 7/1998 |
| EP | 0 965 463 A2 | 12/1999 |
| EP | 974449 A2 | 1/2000 |
| EP | 1980420 A1 | 10/2008 |
| GB | 1257017 | 12/1971 |
| WO | WO 94/11185 A1 | 5/1994 |
| WO | 01/42033 | 6/2001 |
| WO | WO 02/43974 A1 | 6/2002 |
| WO | WO 03/018332 A1 | 3/2003 |
| WO | WO 2005/007422 A1 | 1/2005 |
| WO | WO 2008/045098 A1 | 4/2008 |
| WO | WO 2008/050503 A1 | 5/2008 |
| WO | WO 2008/102048 A1 | 8/2008 |
| WO | WO 2009/005946 A1 | 1/2009 |

OTHER PUBLICATIONS

PCT International Search Report for PCT/US2011/050905, dated Jul. 14, 2008.

PCT International Search Report for PCT/US2011/042310, dated Nov. 3, 2011.

PCT International Search Report for PCT/US2009/060746, dated Jan. 12, 2010.

PCT International Search Report for PCT/US2011/042533, dated Dec. 6, 2011.

* cited by examiner

METHOD AND APPARATUS FOR MULTILAYER SHEAR BAND REINFORCEMENT

FIELD OF THE INVENTION

The present invention relates to reinforcement of a multiple layer shear band as may be used in a non-pneumatic tire and to a method of designing such a shear band. More particularly, the present invention relates to a method of improving the performance characteristics (such as e.g., increasing the bending stiffness) of a shear band without increasing its thickness or to reducing the thickness of a shear band while maintaining its performance characteristics and to shear bands constructed according to such method.

BACKGROUND OF THE INVENTION

The details and benefits of non-pneumatic tire constructions are described e.g., in U.S. Pat. Nos. 6,769,465; 6,994,134; 7,013,939; and 7,201,194. Certain non-pneumatic tire constructions propose incorporating a shear band, embodiments of which have also been described in e.g., U.S. Pat. No. 7,201,194, which is incorporated herein by reference. Such non-pneumatic tires provide advantages in tire performance without relying upon a gas inflation pressure for support of the loads applied to the tire.

Figure 1:
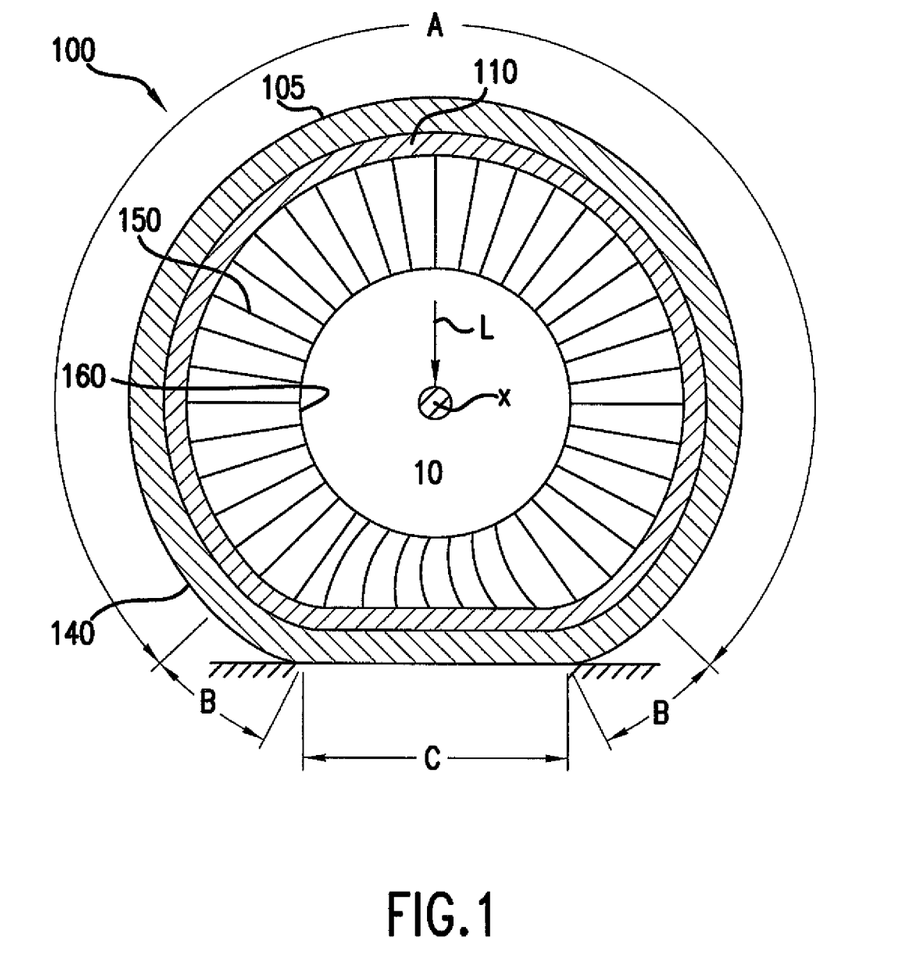
FIG. 1 is a schematic view in the equatorial plane of a non-pneumatic tire under load.

An example of a tire 100 having a ring-shaped shear band 110 is shown in FIG. 1. Tire 100 also includes a plurality of tension transmitting elements, illustrated as web spokes 150, extending transversely across and inward from shear band 110. A mounting band 160 is disposed at the radially inner end of the web spokes. The mounting band 160 anchors the tire 100 to a hub 10. A tread portion 105 is formed at the outer periphery of the shear band 110 and may include e.g., grooves or ribs thereon.

Figure 2:
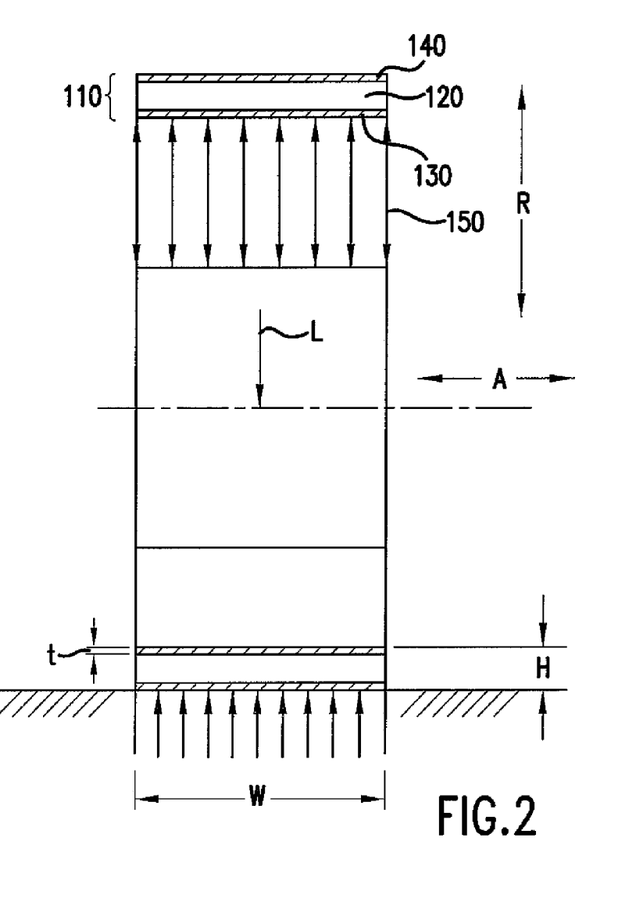
FIG. 2 is a schematic view in the meridian plane of a loaded shear band as used in the non-pneumatic tire of FIG. 1. The tread portion of the non-pneumatic tire is not shown in FIG. 2.

Referring to FIG. 2, which shows the tire 100 in section view in the meridian plane (but without tread portion 105), the reinforced shear band 110 comprises a shear layer 120, an innermost reinforcement layer 130 adhered to the radially innermost extent of the shear layer 120, and an outermost reinforcement layer 140 adhered to the radially outermost extent of the shear layer 120. The reinforcement layers 130 and 140 have a tensile stiffness that is greater than the shear stiffness of the shear layer 120 so that the shear band 110 undergoes shear deformation under vertical load.

More specifically, as set forth in U.S. Pat. No. 7,201,194, when the ratio of the elastic modulus of the reinforcement layer to the shear modulus of the shear layer ($E'_{membrane}/G$), as expressed in U.S. Pat No. 7,201,194, is relatively low, deformation of shear band 110 under load approximates that of a homogenous band and produces a non-uniform ground contact pressure. Alternatively, when this ratio is sufficiently high, deformation of the shear band 110 under load is essentially by shear deformation of the shear layer with little longitudinal extension or compression of the reinforcement layers 130 and 140. As indicated in FIG. 1, a load L placed on the tire axis of rotation X is transmitted by tension in the web spokes 150 to the annular band 110. The annular shear band 110 acts in a manner similar to an arch and provides circumferential compression stiffness and a longitudinal bending stiffness in the tire equatorial plane sufficiently high to act as a load-supporting member. Under load, shear band 110 deforms in contact area C with the ground surface through a mechanism including shear deformation of the shear band 110. The ability to deform with shear provides a compliant ground contact area C that acts similar to that of a pneumatic tire, with similar advantageous results.

The shear layer 120 may be constructed e.g., from a layer of material having a shear modulus of about 3 MPa to about 20 MPa. Materials believed to be suitable for use in the shear layer 120 include natural and synthetic rubbers, polyurethanes, foamed rubbers and polyurethanes, segmented copolyesters, and block co-polymers of nylon. The first 130 and second 140 reinforcement layers comprise essentially inextensible cord reinforcements embedded in an elastomeric coating. For a tire constructed of elastomeric materials, reinforcement layers 130 and 140 are adhered to the shear layer 120 by the cured elastomeric materials.

As stated above, a shear band such as band 110 provides a longitudinal bending stiffness during operation of the tire 100. For certain applications, it is desirable to maintain the overall thickness—along the radial direction R—of shear band 110 while simultaneously increasing its bending stiffness. For example, a designer may seek to maintain the overall diameter of non-pneumatic tire 100 and the shear beam thickness while increasing the bending stiffness of the shear band 110 in order to change the performance characteristics of tire 100. Conversely, for certain other applications, it is desirable to decrease the thickness of shear band 110 while maintaining the bending stiffness of tire 100 and thus reduce mass.

Accordingly, a method for the design of such shear bands and shear bands constructed from such method would be particularly useful. More particularly, a method that allows the designer of a non-pneumatic tire to improve certain mechanical properties of a reference shear band such as e.g., bending stiffness while maintaining the overall dimensions of the non-pneumatic tire would be particularly useful. A method that also allows a designer to decrease the radial thickness of a shear band while maintaining or improving upon certain mechanical properties would also be useful. These and other advantageous aspects of the present invention will be apparent from the description that follows.

SUMMARY OF THE INVENTION

Objects and advantages of the invention will be set forth in part in the following description, or may be obvious from the description, or may be learned through practice of the invention.

In one exemplary aspect of the present invention, a method is provided for modifying a shear band having a thickness of $H_{REF}$ and a total number of reinforcement layers of $N_{REF}$. The method includes determining the vertical stiffness and $(G_{eff}*A)_{REF}$ using a thickness of $H_{REF}$ for the shear band and a total of $N_{REF}$ reinforcement layers for the shear band; selecting a target value $H_{TARGET}$ for the thickness of the shear band; increasing by 1 the total number of reinforcement layers in the shear band; calculating $(G_{eff}*A)_{CALC}$ using a thickness of $H_{TARGET}$ for the shear band and using the number of reinforcement layers for the shear band provided by the increasing step; comparing $(G_{eff}*A)_{CALC}$ from the calculating step with $(G_{eff}*A)_{REF}$ from the determining step and, if $(G_{eff}*A)_{CALC}$ is less than $(G_{eff}*A)_{REF}$, then repeating the increasing step and the calculating step until $(G_{eff}*A)_{CALC}$ is greater than or about equal to $(G_{eff}*A)_{REF}$ and the total number of reinforcement layers becomes $N_{TOTAL}$; and computing the vertical stiffness using a thickness of $H_{TARGET}$ for the shear band and the number of reinforcement layers $N_{TOTAL}$ for the shear band provided by the comparing step. If the vertical stiffness from the computing step is less than the vertical stiffness from the determining step, then the method includes moving at least one of the reinforcement layers between an outermost reinforcement layer and an innermost reinforcement layer to a new position in the shear band that is closer to either the outermost reinforcement layer or the innermost reinforcement layer, and repeating the computing and referring steps until the vertical stiffness from the computing step is greater than or about equal to the vertical stiffness from the determining step.

In another exemplary embodiment of the present invention, a method is provided for modifying a shear band having a radially innermost reinforcement layer and a radially outermost reinforcement layer. The method includes the steps of increasing or maintaining the vertical stiffness of a non-pneumatic tire incorporating the shear band by adding at least one additional reinforcement layer that is positioned between, but spaced apart from, the radially outermost reinforcement layer and the radially innermost reinforcement layer; and decreasing the value of $\mu_{p/p}$ for the shear band.

Variations to this exemplary method of the present invention are further described in the detailed description the follows. The present invention also includes a shear band constructed according to this exemplary method and to a non-pneumatic tire incorporating such a shear band.

For example, in one exemplary embodiment, the present invention includes a shear band having a shear layer, an inner reinforcement layer positioned along one side of said shear layer, and an outer reinforcement layer positioned along the other side of said shear layer such that said shear layer is positioned between said inner and outer reinforcement layers. At least two or more additional reinforcement layers are positioned between and spaced apart from each other and from said outer and inner reinforcement layers such that the shear band has a total of N reinforcement layers and N≥4.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

The present invention relates to reinforcement of a multiple layer shear band as may be used in a non-pneumatic tire and to a method of designing such a shear band. More particularly, the present invention relates to a method of improving the performance characteristics (such as e.g., increasing the bending stiffness) of a shear band without increasing its thickness or to reducing the thickness of a shear band while maintaining its performance characteristics and to shear bands constructed according to such method. For purposes of describing the invention, reference now will be made in detail to embodiments and methods of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

The following terms are defined as follows for this description:

"Equatorial Plane" means a plane that passes perpendicular to the tire axis of rotation and bisects the tire structure.

"Meridian Plane" means a plane that passes through and includes the axis of rotation of the tire.

"Vertical stiffness" is a mathematical relationship between deflection and load for a tire. As described in U.S. Pat. No. 7,201,194, when a non-pneumatic tire containing a shear band is placed under a load L, it deflects a certain amount f and the portion in ground contact conforms to the ground surface to form a ground contact area C. Because the shear band provides a resilient tire, vertical deflection f is proportional to the load L, from which the vertical stiffness of the resilient tire may be derived. There are numerous ways that one of ordinary skill in the art can provide or define a mathematical relationship between deflection and load for a tire. Two such examples, secant vertical stiffness and tangent vertical stiffness, are defined below.

"Secant vertical stiffness" is an example of a mathematical relationship defining vertical stiffness as the quotient of L/f or the load L placed on the non-pneumatic tire divided by the deflection f of the tire as discussed for vertical stiffness above. For a given tire, a plot can be created by measuring deflection for multiple loads L.

"Tangent vertical stiffness" is another example of a mathematical relationship defining vertical stiffness as the slope of a line tangent to a curve created by plotting load L as a function of deflection f for a given non-pneumatic tire containing a shear band at a target load or deflection.

"Contact Pressure" means the average contact pressure for contact area C created by a non-pneumatic tire loaded against the ground or other supporting surface and can be calculated as the quotient of load L divided by the contact area C.

"$\mu_{p/p}$" is a measurement of the peak-to-peak radial displacement of a shear band under load as incorporated into a non-pneumatic tire. As described in U.S. Pat. No. 7,013,939, which is incorporated herein by reference, $\mu_{p/p}$ is a measurement of the buckling or radial displacement that a band can exhibit (which can result in uneven rolling of the tire containing such shear band) when compression forces exceed the ability of the band to shorten. As will be used herein, the peak to peak radial displacement, $\mu_{p/p}$, can be calculated as follows for a shear band comprising multiple reinforcement layers connected by spokes to a hub such as shown in FIGS. 1 and 2:

$$\mu_{p/p} \cong 1.5 \left( \frac{1-v^2}{E_{membrane} I_m} \right) T \left( \frac{r_0}{n} \right)^3 \tag{1}$$

where
$\mu_{p/p}$ is the peak to peak radial displacement (mm);
vis the Poisson's ratio of the shear band;
$E_{membrane}$ is the modulus of elasticity of a reinforcement layer (N/mm$^2$);
$I_m$ is the area moment of inertia of the reinforcement layers (mm$^4$);
T is the spoke tension (N);
$r_0$ is the nominal radius of the shear band (mm); and
n is the number of spokes.

$E_{membrane}$ is the homogenized circumferential modulus of elasticity of a reinforcement layer expressed in units of N/mm$^2$. $E_{membrane}$ for the reinforcement layer may be determined experimentally by ASTM Test Method D 3039, "Standard Test Method for Tensile Properties of Polymer Matrix Composite Materials." For the specific example of a reinforcement layer having cords or cable reinforcements at zero degrees (i.e. perpendicular to the equatorial plane) $E_{membrane}$ may be calculated from the following equation:

$$E_{membrane} = E_{matrix} * V_{fm} + E_{cable} * V_{fc} \quad (2)$$

where,
t is the thickness of the reinforcement layer (mm)
$E_{matrix}$ is the modulus of the matrix or the material making up the non-cable portion of the reinforcement layer (N/mm$^2$)
$V_{fm}$ is the matrix volume fraction
$E_{cable}$ is the cable tensile modulus (N/mm$^2$)
$V_{fc}$ is the cable volume fraction For purposes of describing the present invention, consider non-pneumatic tire 100 of FIGS. 1 and 2 as a reference, having a shear band 110 thickness $H_{REF}$ of 18 mm in thickness, a tread layer 105 of 3.5 mm in thickness, a total tire thickness of 21.5 mm, and a total number of reinforcement layers $N_{REF}$ of two. This reference tire 100 also has an outside diameter $D_o$ of 630 mm and has 50 spokes with a nominal thickness of 3.8 mm. Also, reinforcement layers 130 and 140 each have a nominal $E_{membrane}$ of 2000 daN/mm$^2$ and a thickness of 1 mm. Note that for the sake of clarity in the quantitative values described herebelow, the units of Newtons have been replaced by decaNewtons wherein 1 daN is equal to 10 N.

The performance of non-pneumatic tire 100 as a reference can be evaluated by considering four performance characteristics: Tangent Vertical Stiffness, Secant Vertical Stiffness, Contact Pressure, and $\mu_{p/p}$. Using finite element analysis of a model of non-pneumatic tire 100, the values for these performance characteristics were determined at a vertical load of 400 daN and are set forth in Table 1.

TABLE 1

| Vertical Stiffness (Tangent) | Vertical Stiffness (Secant) | Contact Pressure | $\mu_{p/p}$ |
|---|---|---|---|
| 33.6 daN/mm | 41.0 daN/mm | 2.3 bar | .056 mm |

For purposes of describing the present invention, assume these reference values provide acceptable performance for the intended application of shear band 110. However, for this intended application, assume also that for tire 100 a tread thickness of 6.5 mm is desired instead of the 3.5 mm thick tread portion 105 specified above—i.e., a assume a 3 mm increase in thickness for tread portion 105 is needed while all other features of tire 100 such as e.g., hub 10, spokes 150, tire size, and the materials of construction are acceptable without changes. Therefore, in order to maintain the outside diameter $D_o$ of tire 100 at 630 mm, shear band 110 might be reduced by 3 mm to a target shear band thickness $H_{TARGET}$ of 15 mm in order to accommodate the desired increase in thickness of tread portion 105. Again, using finite element analysis of a model of tire 100, the performance characteristics for tire 100 with a reduction in thickness of 3 mm for shear band 110 were determined and are set forth in Table 2

TABLE 2

| Vertical Stiffness (Tangent) | Vertical Stiffness (Secant) | Contact Pressure | $\mu_{p/p}$ |
|---|---|---|---|
| 30.0 daN/mm | 36.6 daN/mm | 2.0 bar | .065 mm |

Unfortunately, as demonstrated by the results in Table 2, reducing the thickness of the shear band 110 adversely impacts the performance of non-pneumatic tire 100 and does not meet the four acceptable (i.e., target) performance characteristics for the reference tire 100 that are set forth in Table 1 (i.e., the performance characteristics of tire 100 before reducing the thickness of the shear band 110). More specifically, reducing the thickness of shear band 110 has the adverse impact of decreasing the band's stiffness and increasing the potential for peak to peak radial displacement $\mu_{p/p}$ during operation. Therefore, in order to reach the desired design targets set forth in Table 1, certain modifications must be undertaken for shear band 110 if its thickness is to be reduced. Similarly, modifications would also be needed if the designer decided to maintain the reference thickness for shear band 110, $H_{REF}$, while increasing its vertical stiffness.

Therefore, in one exemplary aspect, the present invention provides a method for adding reinforcement to a shear band. However, the present invention does not propose adding reinforcement by increasing the existing reinforcement layers 130 and 140 or adding reinforcement contiguous thereto. Instead, using the methods disclosed herein, the inventors have made the unexpected discovery that by adding reinforcement layers into the shear layer 120 at radial locations that are between, but spaced apart from, the existing reinforcement layers 130 and 140, not only can the desired vertical stiffness characteristics be achieved but an unexpected improvement (i.e., reduction) in radial displacement of the shear band, as measured by $\mu_{p/p}$, can also be accomplished.

In addition, flexibility is provided in that the added reinforcement layers can be uniformly spaced between the existing reinforcement layers 130 and 140 or, if desired, such additional layers can be spaced in a manner that is not uniform. Flexibility is also provided in that the present invention may be used to reduce $H_{REF}$ (the thickness of the reference shear band 110) while maintaining or improving upon certain performance characteristics such as e.g., its bending stiffness. Alternatively, the present invention may be used to improve its performance characteristics (e.g., increasing vertical stiffness) without changing $H_{REF}$. Accordingly, using the reference values of Table 1 as the target values, an exemplary application of the method of the present invention in order to reduce the thickness of reference shear band 110 by 3 mm now follows.

The inventors have determined that the four performance characteristics set forth in Table 1 for the reference shear band 110 are controlled by three products set forth in equations (3), (4), and (5) below, which can be thought of as three structural section properties of shear band 110. Before addressing these equations, it should be noted that the following equations (3) through (8) are based on the assumption that the reinforcement layers are uniform relative to each other. However, as will be understood by one of skill in the art using the teachings disclosed herein, the method described herein may also be applied to a shear band having reinforcement layers that are not uniform. For example, reinforcement layers of different thicknesses may also be applied using the present invention. Accordingly, for uniform reinforcement layers, the three products—i.e., three structural section properties—can be expressed as follows:

$$G_{eff} * A \quad (3)$$

$$E_{membrane} * I_m \quad (4)$$

$$E_{membrane} * A_m \quad (5)$$

where $G_{eff}$ is the effective shear modulus of shear band 110 including the reinforcement layers 130, 140;

A is the total cross sectional area of the shear band 110 (not including the tread layer);

$E_{membrane}$ is the circumferential modulus of the reinforcement layers 130 and 140;

$I_m$ is the contribution to the area moment of inertia of the reinforcement layers; and $A_m$ is the total cross-sectional area of the reinforcement layers.

$G_{eff}$, the effective shear modulus of shear band 110, is calculated as follows:

$$G_{eff} = \frac{G_m G_{sl} H}{G_{sl} N t + G_m (H - Nt)} \quad (6)$$

where $G_m$ is the shear modulus of the reinforcement layers;

$G_{sl}$ is the shear modulus of the elastomer used for the shear layer;

H is the total thickness of the shear band including reinforcement the layers;

N is the total number of reinforcement layers; and t is the thickness of the reinforcement layers;

The area moment of the inertia, $I_m$, is calculated by one of the following two equations depending upon whether an even or odd number of reinforcement layers are used in shear band 110. For an even number of reinforcement layers, the area moment of inertia $I_m$ will be expressed as $I_{Neven}$, and the following equation provides for the calculation of $I_{Neven}$:

$$I_{Neven} = NI_0 + 2tw\left[h_{Beven}^2 + \sum_{i=1}^{\frac{N}{2}-1}(h_{Beven} + h_N)^2\right] \quad (7)$$

where w is the width of a reinforcement layer;

t is the thickness of a reinforcement layer along radial direction R;

$h_N$ is the distance, along the radial direction R, from the center of one reinforcement layer to the center of the next reinforcement layer;

$I_0$ is the area moment of inertia of an individual reinforcement layer about its own axial centerline;

$h_{Beven}$ is calculated as $$h_{Beven} = \frac{(H - t) - (N - 2)h_N}{2};$$

$$h_N = (h_{max} - h_{min})k + h_{min};$$

$$h_{max} = \frac{H - t}{N - 1};$$

$$h_{min} = \frac{3t}{2}, \text{ and};$$

k is a spacing bias parameter, where a value of 1 is used for relatively equal spacing between the reinforcement layers whereas a value of 0 gives a minimum spacing of the outer reinforcement layers.

Figure 3:
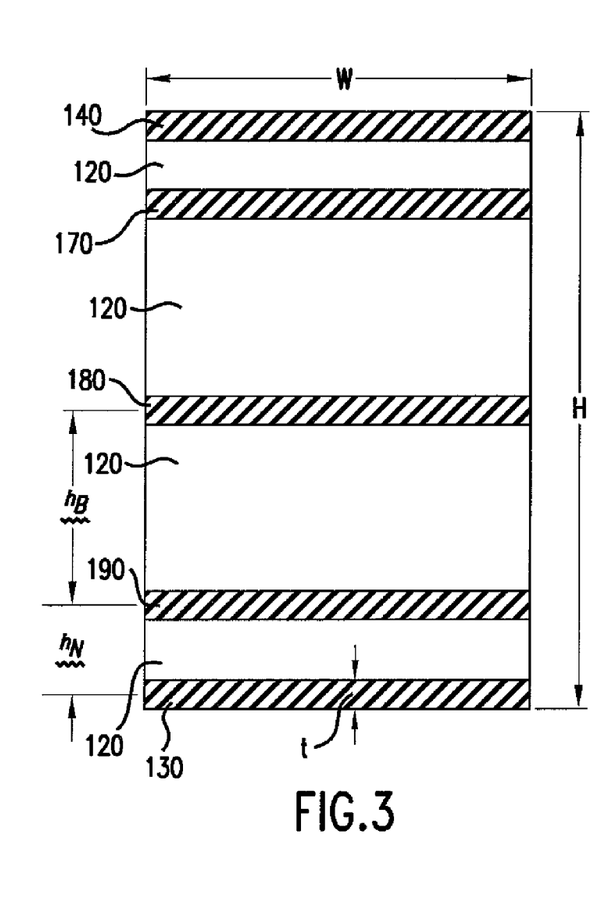
FIG. 3 is a schematic view in the meridian plane of an exemplary embodiment of a shear band of the present invention. The shear band has five reinforcement layers i.e., three reinforcement layers are added between the innermost and outermost reinforcement layers.

For an odd number of reinforcement layers as shown in FIG. 3, the area moment of inertia $I_m$ will be expressed as $I_{Nodd}$, and the following equation provides for the calculation of $I_{Nodd}$:

$$I_{Nodd} = NI_0 + 2tw\left[h_{Bodd}^2 + \sum_{i=1}^{\frac{N-1}{2}-1}(h_{Bodd} + h_N)^2\right] \quad (8)$$

where $$h_{Bodd} = \frac{(H - t) - (N - 3)h_N}{2}; \text{ and}$$

$$I_0 = (1/12) * W * t^3.$$

Calculated as shown above, the three structural section properties $G_{eff}*A$, $E_{membrane}*I_m$, and $E_{membrane}*A_m$ can be used to reconstruct shear band 110 as needed while still meeting (or improving upon) the target performance characteristics of reference tire 100 set forth in Table 1. For the example introduced above, it is desired to reduce the overall thickness H of the reference shear band 110 by 3 mm while still meeting or improving upon the performance characteristics of Table 1. However, other changes to shear band 110 can also be accomplished using the methods of the present invention as well. For example, the original value of the shear band 110 thickness ($H_{REF}$) could be targeted for reduction by as much as 50 percent. In fact, any value for the desired thickness shear band 110 may be targeted ($H_{TARGET}$), provided such value is at least four times the thickness of a reinforcement layer (t). Alternatively, the methods of the present invention also allow for the original value of the shear band thickness $H_{REF}$ to remain constant while the values for Secant Vertical Stiffness and Tangent Vertical Stiffness are increased or $\mu_{p/p}$ is decreased. Regardless, as part of an exemplary method of the present invention, a value for $H_{TARGET}$ is specified for the new construction of shear band 110, where $H_{TARGET}$ may be the same or smaller than $H_{REF}$.

Using the selected target value for thickness $H_{TARGET}$, the structural section property $G_{eff}*A$ is then calculated for a shear band having at least one additional reinforcement layer as compared to the reference shear band 110. For example, reference shear band 110 is shown as having two reinforcement layers 130 and 140, or an $N_{REF}$ value equal to 2. Accordingly, a new $G_{eff}*A$ is calculated, $(G_{eff}*A)_{CALC}$, for the shear band now having three reinforcement layers and a thickness of $H_{TARGET}$, but otherwise constructed in a manner similar to shear band 110 (It should be noted that, as used herein, N can be any positive integer greater than 1. For example, the reference shear band for which modification is desired could already have three reinforcement layers, an $N_{REF}$ value equal to 3).

The new $(G_{eff}*A)_{CALC}$ as determined using three reinforcement layers (N=3) is then compared to $(G_{eff}*A)_{REF}$ for the reference shear band 110. If the newly calculated $(G_{eff}*A)_{CALC}$ is less than the reference value of $(G_{eff}*A)_{REF}$ for reference shear band 110, then the number of reinforcement layers is again increased by one (N=4) and the value for $(G_{eff}*A)_{CALC}$ is again recalculated. This process is repeated until the new value for $(G_{eff}*A)_{CALC}$ is greater than or about equal to the original value of $(G_{eff}*A)_{REF}$ for the reference shear band 110 with only two reinforcement layers 130 and 140, or $N_{REF}=2$. As used herein, $N_{TOTAL}$ represents the total number of reinforcement layers when $(G_{eff}*A)_{CALC}$ becomes greater than or about equal to the original value of $(G_{eff}*A)_{REF}$.

The process of increasing the number of reinforcement layers N until the new value $(G_{eff}*A)_{CALC}$ is more than the reference value for $(G_{eff}*A)_{REF}$ can be repeated until the following limit is reached:

$$(H_{TARGET} - Nt)/(N-1) \leq t/2 \quad (9)$$

This limit ensures that there will be a distance of at least one-half the thickness of a single reinforcement layer between adjacent reinforcement layers (assuming equal spacing). For equally spaced reinforcement layers, it should be noted that an addition that creates an odd number of reinforcement layers will proportionally increase $G_{eff}*A$ and $E_{membrane}*A_m$ but will have a much more limited impact on $E_{membrane}*I_m$ because at least one reinforcement layer will be positioned about the middle or "neutral fiber" of the shear layer. If the limit of equation (9) is reached before the value of $(G_{eff}*A)_{CALC}$ becomes greater than the reference value $(G_{eff}*A)_{REF}$, then the value for thickness $H_{TARGET}$ must be increased and the process repeated—i.e., starting again with a total of $N_{REF}+1$ reinforcement layers—until the new $(G_{eff}*A)_{CALC}$ is at or above the reference value of $(G_{eff}*A)_{REF}$.

Upon adding an additional reinforcement layer that provides a $(G_{eff}*A)_{CALC}$ close to or above the reference value of $(G_{eff}*A)_{REF}$, the values for $E_{membrane}*A_m$ are $E_{membrane}*I_m$ at the new number of reinforcement layers can also be calculated. The new value for $E_{membrane}*A_m$ will always exceed the reference values of $E_{membrane}*A_m$ because this structural section property is directly affected by the number of reinforcement layers and because at least one reinforcement layer has been added to the original shear band 110 at this point in the process. However, the computed value for $E_{membrane}*I_m$ may not meet or exceed the reference value for $E_{membrane}*I_m$.

Using $H_{TARGET}$ and $N_{TOTAL}$ (the number of reinforcement layers at which $(G_{eff}*A)_{CALC}$ exceeded the reference $(G_{eff}*A)_{REF}$), the values of the four performance characteristics—i.e., the Tangent Vertical Stiffness, Secant Vertical Stiffness, Contact Pressure, and $\mu_{p/p}$—are determined using e.g., finite element analysis and a model of the tire with the shear band now having $N_{TOTAL}$ reinforcement layers. The new values for the Tangent Vertical Stiffness, Secant Vertical Stiffness, Contact Pressure and $\mu_{p/p}$ are then compared to the original reference values (e.g., the values in Table 1). If the new values meet or exceed the original reference values, then the process can be stopped as the design goal has been reached.

If, however, the new values for Tangent Vertical Stiffness or Secant Vertical Stiffness are lower than the reference values for Tangent and Secant Vertical Stiffness, then $E_{membrane}*I_m$ must be increased. Alternatively, even if the new values for Tangent Vertical Stiffness, Secant Vertical Stiffness, Contact Pressure are acceptable, the new value for $\mu_{p/p}$ may be unacceptable or further reduction may be desired and, therefore, $E_{membrane}*I_m$ must be increased. To increase $E_{membrane}*I_m$, the value for spacing bias parameter k set forth with equations (7) and (8) above must be decreased incrementally. As the bias parameter k is decreased, the reinforcement layers added to the shear band that are not located on the neutral fiber will be pushed out toward the outermost and innermost reinforcement layers 130 and 140 and this will cause $E_{membrane}*I_m$ to increase without impacting the value of thickness $H_{TARGET}$, $(G_{eff}*A)_{CALC}$, or $(E_{membrane}*A_m)_{CALC}$.

Accordingly, for each new value of parameter k selected, another model of the tire with the shear band construction using the new value for parameter k is constructed and e.g., finite element analysis is used to compute the four performance characteristics—i.e., the Tangent Vertical Stiffness, Secant Vertical Stiffness, Contact Pressure, and $\mu_{p/p}$. These new values are again compared to the reference values. If the Vertical Stiffness (Tangent, Secant, or both) are less than the values of Vertical Stiffness for the reference shear band, then the process of decreasing parameter k is continued until the new values exceed or are about equal to the reference values for Vertical Stiffness. Even if the new Vertical Stiffness values are acceptable, the process of decreasing parameter k can also be repeated if the value for $\mu_{p/p}$ is unacceptable—i.e., too large or higher than the value of $\mu_{p/p}$ for the reference shear band 110.

If parameter k reaches zero before the new values of Tangent Vertical Stiffness, Secant Vertical Stiffness, and $\mu_{p/p}$ reach acceptable or target values, then the value of $H_{TARGET}$ must be increased and the process must be repeated again starting with one more reinforcement layer than the reference shear band 110 i.e., $N_{REF}+1$. More specifically, for shear band 110 having NREF=2, the value of $H_{TARGET}$ is increased and a new value for $(G_{eff}*A)_{CALC}$ is calculated restarting with a value of N=3 reinforcement layers. This $(G_{eff}*A)_{CALC}$ is then compared to $(G_{eff}*A)_{REF}$, and if $(G_{eff}*A)_{CALC}$ is not greater than or about equal to $(G_{eff}*P)_{REF}$, the process is then repeated by increasing the number of reinforcement layers N again as previously described.

The method described above was applied to the reference shear band 110 having only two reinforcement layers 130 and 140. The results are set forth in Table 3:

TABLE 3

| | | | | | Inputs | | | | | | | | |
|---|---|---|---|---|---|---|---|---|---|---|---|---|---|
| H | N | k | t | W | $E_{membrane}$ | $G_m$ | $G_{sl}$ | $G_{eff}$ | $G_{eff}*A$ | $I_m$ | $E_{membrane}*I_m$ | A | $E_{membrane}*A$ |
| 18 | 2 | 1 | 1.00 | 230 | 2000 | 100 | 0.400 | .45 | 1.862 | 33,273 | 66,546,667 | 460 | 920,000 |
| 15 | 2 | 1 | 1.00 | 230 | 2000 | 100 | 0.400 | .46 | 1,591 | 22,578 | 45,156,667 | 460 | 920,000 |
| 15 | 3 | 1 | 1.00 | 230 | 2000 | 100 | 0.400 | .50 | 1,723 | 22,598 | 45,195,000 | 690 | 1,380,000 |
| 15 | 4 | 1 | 1.00 | 230 | 2000 | 100 | 0.400 | .54 | 1,879 | 25,121 | 50,242,222 | 920 | 1,840,000 |

Note:
Units are mm and daN

The first row of data indicates the reference shear band 110 having a shear layer thickness $H_{REF}$ of 18 mm, a width W of 230 mm, and two (N=2) reinforcement layers. The three rows that follow are performed with the target thickness of $H_{TARGET}$ of 15 mm with the goal of reducing the thickness of the shear band 110 while maintaining or improving certain performance characteristics such as vertical stiffness and $\mu_{p/p}$. Although it is perhaps not possible to match the performance characteristics exactly, as shown in Table 3, a $(G_{eff}*A)_{CALC}$ that exceeded the value $(G_{eff}*A)_{REF}$ for the reference shear band 110 is obtained when four reinforcement layers (N=4) are used. It is again noted that the above-described method assumes that the construction of tire 100 otherwise remains the same—i.e., the same materials (e.g., elastomers) are used for the shear layer 120, the same number of web spokes 150 are used, the same hub is used, etc.

Using the value of four reinforcement layers ($N_{TOTAL}$=4), tire 100 was modeled again and, using finite element analysis, the four performance characteristics used in Table 1 (Tangent Vertical Stiffness, Secant Vertical Stiffness, Contact Pressure, and $\mu_{p/p}$) were recalculated. The results are set forth in Table 4.

TABLE 4

| Vertical Stiffness (Tangent) | Vertical Stiffness (Secant) | Contact Pressure | $\mu_{p/p}$ |
|---|---|---|---|
| 32.5 daN/mm | 40.3 daN/mm | 2.31 bar | .046 mm |

A comparison of Table 4 and Table 1 shows that the thickness of the shear band 110 can be reduced by 3 mm while maintaining its vertical stiffness characteristics. However, Table 4 also provides an unexpected result in that $\mu_{p/p}$ has actually decreased by reducing the thickness H of shear band 110 and doubling the number of reinforcement layers. More specifically, the targeted modification of shear band 110 will not only allow for an increase in the tread portion 105 by 3 but will also result in less radial displacement of the shear band 110 and, therefore, smoother operation of tire 100.

It should be understood that shear layer 120 may be constructed from any material that provides the desired mechanical properties described herein. While elastomeric materials may be used, the present invention is not limited to such. For example, materials that may be used for shear layer 120 include those previously described (natural and synthetic rubbers, polyurethanes, foamed rubbers and polyurethanes, segmented copolyesters, and block co-polymers of nylon) as well non-elastomeric materials such as, for example, fiber-reinforced composites or meta-materials. Accordingly, the shear band 110 of the present invention is not necessarily limited to a particular material identity.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for modifying a shear band having a thickness of $H_{REF}$ and a total number of reinforcement layers of $N_{REF}$, the method comprising the steps of:
   determining the vertical stiffness and $(G_{eff}*A)_{REF}$ using a thickness of $H_{REF}$ and a total of $N_{REF}$ reinforcement layers for the shear band;
   selecting a target value $H_{TARGET}$ as the thickness of the shear band;
   increasing by 1 the total number of reinforcement layers in the shear band;
   calculating $(G_{eff}*A)_{CALC}$ using a thickness of $H_{TARGET}$ for the shear band and using the number of reinforcement layers provided by said increasing step for the shear band;
   comparing $(G_{eff}*A)_{CALC}$ from said calculating step with $(G_{eff}*A)_{REF}$ from said determining step and, if $(G_{eff}*A)_{CALC}$ is less than $(G_{eff}*A)_{REF}$, then repeating said increasing step and said calculating step until $(G_{eff}*A)_{CALC}$ is greater than or about equal to $(G_{eff}*A)_{REF}$ and the total number of reinforcement layers becomes $N_{TOTAL}$;
   computing the vertical stiffness using a thickness of $H_{TARGET}$ for the shear band and the number of reinforcement layers $N_{TOTAL}$ for the shear band as provided by said comparing step;
   referring to the vertical stiffness from said computing step and the vertical stiffness from said determining step and, if the vertical stiffness from said computing step is less than the vertical stiffness from said determining step, then
   moving at least one of the reinforcement layers between an outermost reinforcement layer and an innermost reinforcement layer to a new position in the shear band that is closer to either the outermost reinforcement layer or the innermost reinforcement layer, and repeating said computing and referring steps until the vertical stiffness from said computing step is greater than or about equal to the vertical stiffness from said determining step; and
   constructing a shear band having a total number of reinforcement layers of $N_{TOTAL}$ once the vertical stiffness from said computing step is the same or greater than the vertical stiffness from said determining step.

2. A method for modifying a shear band having a thickness of $H_{REF}$ and a total number of reinforcement layers of $N_{REF}$ as in claim 1, further comprising the step of increasing the target thickness $H_{TARGET}$ of the shear band if the distance between any adjacent reinforcement layers in the shear band becomes less than one-half the thickness of a single reinforcement layer.

3. A method for modifying a shear band having a thickness of $H_{REF}$ and a total number of reinforcement layers of $N_{REF}$ as in claim 2, further comprising repeating said steps of increasing, calculating, comparing, computing and referring beginning with a total of $N_{REF}$ reinforcement layers in the shear band.

4. A method for modifying a shear band having a thickness of $H_{REF}$ and a total number of reinforcement layers of $N_{REF}$ as in claim 1, further comprising the step of increasing the target thickness $H_{TARGET}$ of the shear band if said step of comparing does not provide a $(G_{eff}*A)_{CALC}$ that is greater than or about equal to $(G_{eff}*A)_{REF}$.

5. A method for modifying a shear band having a thickness of $H_{REF}$ and a total number of reinforcement layers of $N_{REF}$ as in claim 4, further comprising repeating said increasing, calculating, comparing, computing and referring steps beginning with a total of $N_{REF}$ reinforcement layers in the shear band.

6. A method for modifying a shear band having a thickness of $H_{REF}$ and a total number of reinforcement layers of $N_{REF}$ as in claim 1, further comprising the step of increasing the target thickness of the shear band $H_{TARGET}$.

7. A method for modifying a shear band having a thickness of $H_{REF}$ and a total number of reinforcement layers of $N_{REF}$ as in claim 1, further comprising the steps of:
    calculating the value of $\mu_{p/p\ REF}$ using a thickness of $H_{REF}$ for the shear band and a total of $N_{REF}$ reinforcement layers for the shear band;
    calculating the value of $\mu_{p/pTARGET}$ using a thickness of $H_{TARGET}$ for the shear band and using the number of reinforcement layers $N_{TOTAL}$ for the shear band provided by said comparing step; and
    comparing the value of $\mu_{p/pTARGET}$ to $\mu_{p/pREF}$ and, if $\mu_{p/pTARGET}$ is not less than or about equal to $\mu_{p/pREF}$, then moving at least one of the reinforcement layers between an outermost reinforcement layer and an innermost reinforcement layer to a new position in the shear band that is closer to either the outermost reinforcement layer or the innermost reinforcement layer.

8. A method for modifying a shear band having a thickness of $H_{REF}$ and a total number of reinforcement layers of $N_{REF}$ as in claim 1, further comprising the step of changing the design of the shear band having a thickness of $H_{REF}$ and a total of $N_{REF}$ reinforcement layers using the results of said computing and said referring steps.

9. A method for modifying a shear band having a thickness of $H_{REF}$ and a total number of reinforcement layers of $N_{REF}$ as in claim 1, wherein $H_{TARGET}$ as first used in said selecting step is about one-half of $H_{REF}$.

10. A method for modifying a shear band having a thickness of $H_{REF}$ and a total number of reinforcement layers of $N_{REF}$ as in claim 1, further comprising the step of manufacturing a shear band having a thickness of $H_{TARGET}$ as used in said selecting step and having the number of reinforcement layers $N_{TOTAL}$ provided by said comparing step.

11. A method for modifying a shear band having a thickness of $H_{REF}$ and a total number of reinforcement layers of $N_{REF}$ as in claim 10, wherein the total number of reinforcement layers $N_{TOTAL}$ is four.

12. A method for modifying a shear band having a thickness of $H_{REF}$ and a total number of reinforcement layers of $N_{REF}$ as in claim 1, farther comprising increasing the thickness t of the reinforcement layers if said comparing step does not result in a $(G_{eff}*A)_{CALC}$ that is greater than or about equal to $(G_{eff}*A)_{REF}$.

13. A method for modifying a shear band having a thickness of $H_{REF}$ and a total number of reinforcement layers of $N_{REF}$ as in claim 12, further comprising repeating said steps of increasing, calculating, comparing, computing and referring beginning with a total of $N_{REF}$ reinforcement layers in the shear band.

14. A method for modifying a shear band having a thickness of $H_{REF}$ and a total number of reinforcement layers of $N_{REF}$ as in claim 1, further comprising the step of increasing the circumferential shear modulus $G_m$ of the reinforcement layers if said comparing step does not result in a $(G_{eff}*A)_{CALC}$ that is greater than or about equal to $(G_{eff}*A)_{REF}$.

15. A method for modifying a shear band having a thickness of $H_{REF}$ and a total number of reinforcement layers of $N_{REF}$ as in claim 14, further comprising repeating said steps of increasing, calculating, comparing, computing and referring beginning with a total of $N_{REF}$ reinforcement layers in the shear band.

16. A method for modifying a shear band having a thickness of $H_{REF}$ and a total number of reinforcement layers of $N_{REF}$ as in claim 1, further comprising the step of increasing the circumferential modulus $E_{membrane}$ of the reinforcement layers if said comparing step does not result in a vertical stiffness that is greater than or equal to the vertical stiffness from said determining step.

17. A method for modifying a shear band having a thickness of $H_{REF}$ and a total number of reinforcement layers of $N_{REF}$ as in claim 16, further comprising repeating said steps of increasing, calculating, comparing, computing and referring beginning with a total of $N_{REF}$ reinforcement layers in the shear band.

18. A method for modifying a shear band having a thickness of $H_{REF}$ and a total number of reinforcement layers of $N_{REF}$ as in claim 1, further comprising the step of increasing the circumferential modulus $E_{membrane}$ of the reinforcement layers if said comparing step does not result in a value of $\mu_{p/p}$ that is greater than the value of $\mu_{p/p}$ using a thickness of $H_{REF}$ for the shear band and using the number of reinforcement layers $N_{REF}$ for the shear band.

19. A method for modifying a shear band having a thickness of $H_{REF}$ and a total number of reinforcement layers of $N_{REF}$ as in claim 18, further comprising repeating said steps of increasing, calculating, comparing, computing and referring beginning with a total of $N_{REF}$ reinforcement layers in the shear band.

20. A method for modifying a shear band having a thickness of $H_{REF}$ and a total number of reinforcement layers of $N_{REF}$ as in claim 1, wherein the vertical stiffness of said step of determining is the secant vertical stiffness.

21. A method for modifying a shear band having a thickness of $H_{REF}$ and a total number of reinforcement layers of $N_{REF}$ as in claim 1, wherein said moving step further comprises increasing the value of parameter k for a non-pneumatic tire incorporating the shear band.

22. A method for modifying a shear band having a thickness of $H_{REF}$ and a total number of reinforcement layers of $N_{REF}$ as in claim 21 further comprising the step of increasing the target thickness $H_{TARGET}$ of the shear band if the value of parameter k is reduced to about zero.

23. A shear band designed using the method of claim 1.

24. A non-pneumatic tire incorporating a shear band designed using the Method of claim 1.

* * * * *